May 25, 1926.  1,586,186

A. W. ERDMAN

MILLING HOB

Filed May 12, 1923   3 Sheets-Sheet 1

INVENTOR
A. W. Erdman
BY Wayne B Wells
ATTORNEY

May 25, 1926.
A. W. ERDMAN
MILLING HOB
Filed May 12, 1923    3 Sheets-Sheet 2
1,586,186
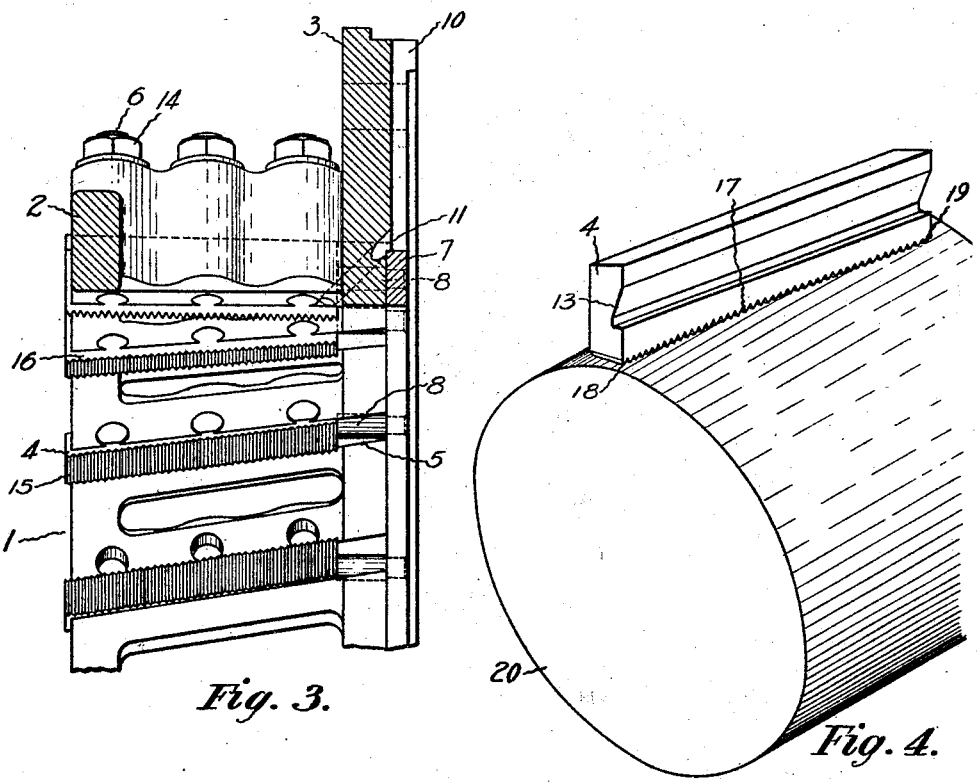
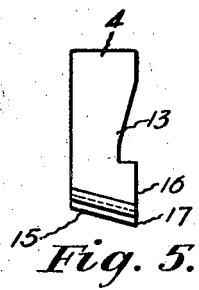
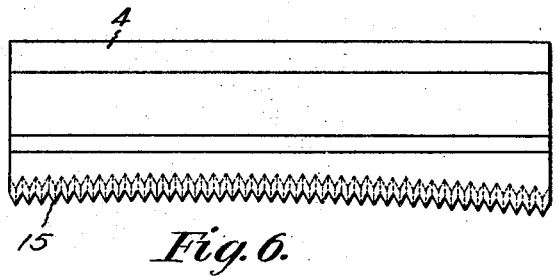
INVENTOR
A. W. Erdman
BY Wayne B Wells
ATTORNEY May 25, 1926.
A. W. ERDMAN
1,586,186
MILLING HOB
Filed May 12, 1923      3 Sheets-Sheet 3
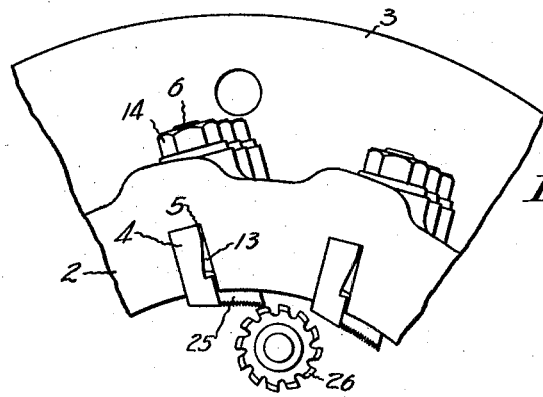
Fig. 7.
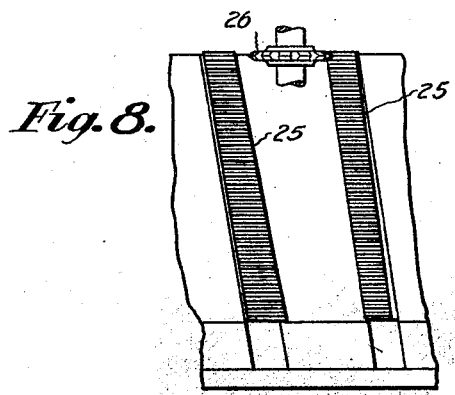
Fig. 8.
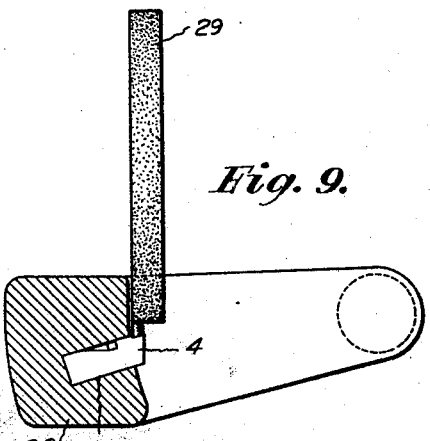
Fig. 9.
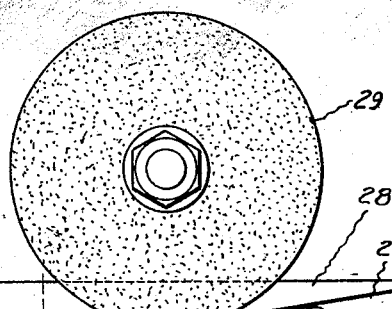
Fig. 10.
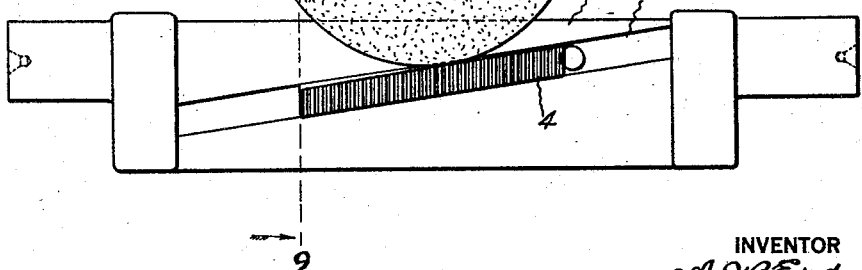
INVENTOR
A. W. Erdman
BY Wayne B Wells
ATTORNEY Patented May 25, 1926.

1,586,186

UNITED STATES PATENT OFFICE.

ALBERT W. ERDMAN, OF HARTFORD, CONNECTICUT, ASSIGNOR TO PRATT & WHITNEY COMPANY, OF NEW YORK, N. Y., A CORPORATION OF NEW JERSEY.

MILLING HOB.

Application filed May 12, 1923. Serial No. 638,542.

My invention relates to hobs and particularly to hobs for cutting pipe threads.

One object of my invention is to provide a hob having internal teeth formed thereon that shall have the cutting faces and the cutting edges of the chaser members so arranged as to cut threads in an improved and efficient manner.

A further object of my invention is to provide a hob of the above indicated character that shall have the cutting faces non-radially arranged and the cutting edges inclined with respect to the hob axis and that shall have the tops of the teeth so formed as to compensate for the inclination of the cutting edges with respect to the hob axis and for the taper formed on the threads being cut.

In the usual method of hobbing threads, a hob having teeth formed on the outside surface thereof is operated in engagement with the blank. A hob of such type is suitable for operating on blanks of small diameter. In operating on blanks of large diameter, such as large size pipes, it has been found advantageous to utilize the so-called "internal hob" for cutting the threads. The term "internal hob" is intended to refer to a hob which surrounds the blank being operated on. Although a hob of such type is provided with chaser members somewhat in the manner of the usual thread die, only a few of the chaser members are held in engagement with the blank being cut. Preferably, the hob and the blank are mounted on different centers in order to rotate the hob and blank in engagement with each other while cutting threads on the blank with a limited number of chaser members.

In a hob constructed in accordance with my invention, the chaser members are secured to the body portion of the hob in an improved manner by means of bolts having wedge-shaped surfaces which engage similar wedge-shaped surfaces on the chaser members. Preferably the chaser members are mounted in slots which are longitudinally inclined with respect to the hob axis. The cutting faces of the chaser members are non-radially arranged and the cutting edges are longitudinally inclined with respect to the hob axis. Inasmuch as the cutting edges are longitudinally inclined with respect to the axis of the hob, it is essential to form the tops of the hob teeth concave in order that correct pipe threads may be formed on the blank. The cutting edges may be helically arranged with respect to the hob axis or may be straight as desired. Preferably the cutting faces of the chaser members are ground.

In the accompanying drawings:

Fig. 3 is a section taken along the line 3—3 of Fig. 1.

Fig. 4 is a diagrammatic view showing the position of a chaser member on a blank.

Figs. 5 and 6 are respectively end and side elevational views of a chaser member.

Figs. 7 and 8 are diagrammatic views of one method of forming a modified hob.

Figs. 9 and 10 are diagrammatic views illustrating the grinding of a hob formed in accordance with the method shown in Figs. 7 and 8.

Figure 1:
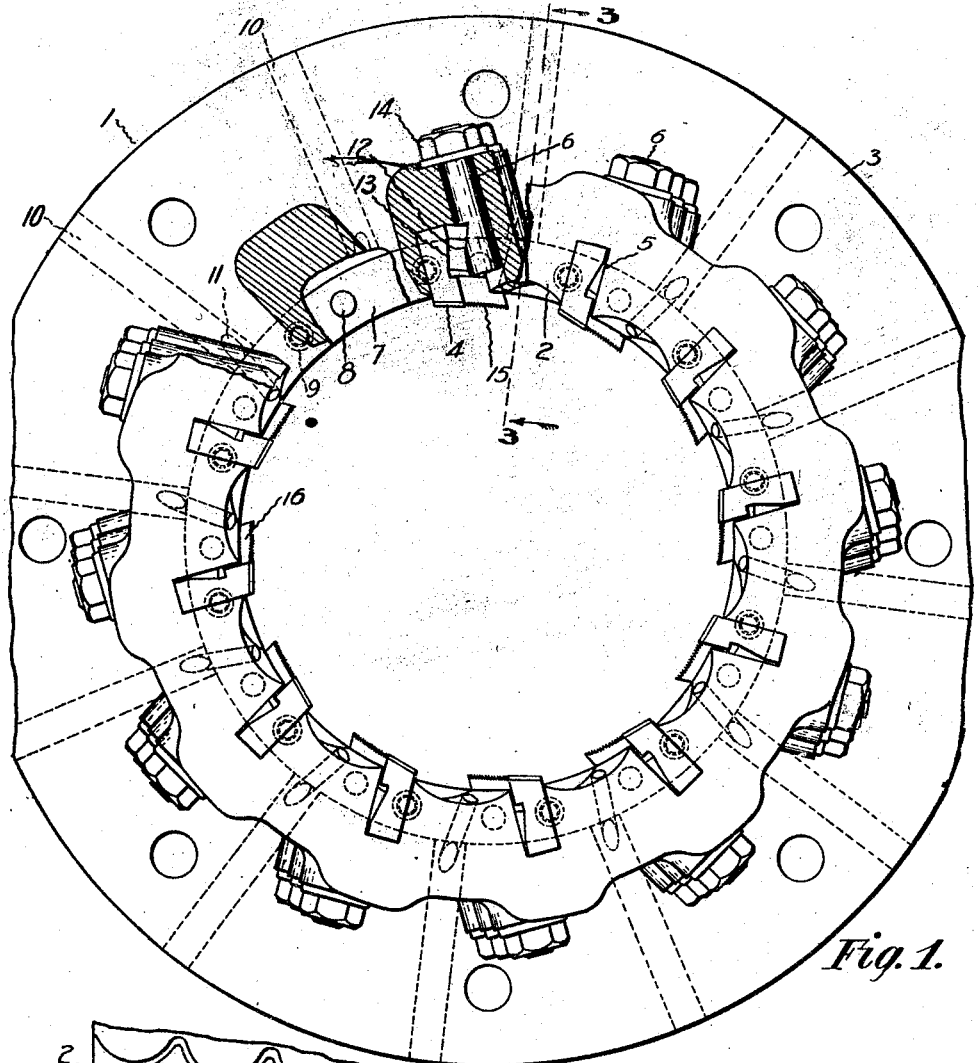
Figure 1 is a plan view of an internal hob constructed in accordance with my invention.
Figure 2:
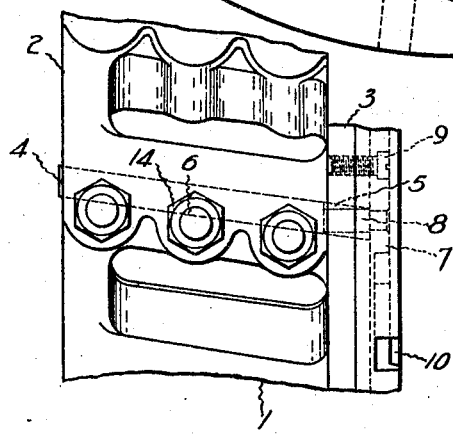
Fig. 2 is a partial side view of the hob shown in Fig. 1.

Referring to Figs. 1 to 6, inclusive, of the drawings, an internal hob 1 is illustrated comprising a body member 2. The body member 2, which has a flange portion 3 projecting therefrom, is adapted to carry a plurality of chaser members 4. The chaser members 4 are preferably disposed in slots 5, which are longitudinally inclined with respect to the hob axis. Suitable bolts 6 are provided for holding the chaser members 4 in position in the slots 5.

A ring member 7, which is fitted in an annular groove formed in the back of the body member 2, carries a plurality of pins 8 which limit the inward movement of the chaser members 4. The pins are secured to the ring 7 in any suitable manner and extend into the slots 5, as shown in Fig. 3 of the drawings. The ring 7 is suitably secured to the body member 2 by screws 9.

A plurality of radially arranged slots 10 are cut in the back of the flange 3 of the body member 2, as shown in Figs. 1 and 3 of the drawings. Oil ducts 11 are drilled through the body member 2 of the hob, as shown in Fig. 3 of the drawings, in order to carry oil supplied by the grooves 10 to the front cutting faces of the chaser members.

The bolts 6, which hold the chaser members 4 in position, are each provided with an inclined or wedge surface 12 which engages a similar inclined surface 13 on the associated chaser member, as shown in Fig. 1 of the drawings. The chaser members are placed in the slots 5 in engagement with the pins 8. When in such position, the nuts 14 on the bolts 6 are tightened to hold the chaser members against any movement.

The chaser members 4 are provided with teeth 15 which are formed annular and without any lead. The front cutting faces 16 of the chaser members are non-radially arranged in order to improve the cutting action and the front cutting edges are longitudinally inclined with respect to the hob axis in order to effect a shearing cut. Preferably the slots 5 are so formed in the body member 2 that the sides thereof are non-radially arranged as shown in Fig. 1 of the drawings. Accordingly the chaser members set in such slots will have cutting faces which operate in the manner of undercut faces. Inasmuch as the cutting edge of each chaser member is not placed parallel with the axis of the hob and accordingly parallel with the axis of the blank being operated on, it is apparent some means must be provided to compensate for the curvature of the blank being operated on.

Referring to Fig. 4 of the drawings, it is apparent the point 18 of the cutting edge 17 is not in alignment with the rear point 19 of the cutting edge 17. The two points 18 and 19 on the cutting edge 17 are not located in the same axial plane. Accordingly, some compensation must be made in the shape of the cutting edge 17 and of the tops of the teeth 15 in order to conform to the curvature of the blank 20. If the blank 20 is a pipe and is having pipe threads cut thereon, it is apparent further compensation must be made in accordance with the taper of the threads. Upon considering Fig. 4 of the drawings, it is apparent the tops of the teeth 15 must be formed concave as is illustrated in Fig. 6 of the drawings. The amount of curvature of the cutting edge is exaggerated in Fig. 6 in order to more clearly illustrate such curvature.

The teeth 15 of the chaser members 4 are formed without lead as heretofore set forth. Accordingly, a hob of this character cannot be operated as a pipe die wherein all the chaser members are in engagement with the blank at all times during the cutting action. In operating the hob, the blank is eccentrically mounted with respect to the hob in order to insure that a limited number of chaser members engage the hob. Thus only a limited number of the chaser members simultaneously cut threads on the blank. Suitable relief is provided on the teeth 15 back of the front cutting edge 17 in order to permit the grinding of the front cutting face 16 without destroying the contour of the threads cut by the chaser members. The part of the body member 2 between the chaser members 4 is hollowed out or cut away in order to allow room for the chips cut by the teeth on the chaser members.

Although the chaser members 4 are shown positioned in inclined slots, it is apparent such chaser members may be inserted in slots which are parallel to the axis of the hob. In such latter case, it is apparent the cutting faces of the chaser members are cut away to form the desired angle with respect to the hob axis. The curvature formed on the tops of the chaser members may be roughly figured with sufficient accuracy by forming a circle having a radius equal to the distance from the center of the hob to the desired cutting edge on a chaser member. Referring to Fig. 4, the points 18 and 19 may be placed on the circle formed as above set forth. Drawing a chord through such points, the maximum depth of the curvature to be formed on each chaser member is readily determined by measuring the maximum distance between the chord and the arc subtended by it. Knowing the width of the chaser members and the depth of the curvature to be formed on each of them, the curvature may be readily determined as accurately as threads may be cut by modern tools. In determining the curvature of the cutting edge 17, it is apparent not only the curvature of the pipe must be taken into account but also the tapered form of the threads. In considering tapered pipe threads, it is apparent the points 18 and 19 must be placed on circles of different diameters in order to determine the depth of the curvature to be formed on the chaser members.

Referring to Figs. 7 to 10, inclusive, a modification of my invention is illustrated wherein the front cutting faces of the chaser members are helicoidal in form. Similar parts in Figs. 7, 8, 9 and 10 to those shown in Figs. 1 to 6, inclusive, are designated by like reference characters. The chaser members 4 are shown inserted in slots 5, which are longitudinally inclined with respect to the blank axis in the same manner as the slots shown in the hob illustrated in Figs 1 to 6, inclusive. It is to be understood, however, that if so desired, the slots 5 may be formed parallel to the blank axis. However, in such latter case, considerable work would be necessary to cut away the cutting faces to the desired angle with respect to the hob axis. The chaser members 4 are held in position by bolts 6 in the same manner as the chaser members shown in Figs. 1 to 6, inclusive. The cutting face 25 of each chaser member is not formed straight, as in the case of the chaser members shown in Figs. 1 to 6, inclusive, but is formed helicoidal. The top of the chaser member must be formed concave, as in the case of the chaser members shown in Figs. 1 to 6, inclusive, in order to conform to the curvature of the pipe being cut as well as to the tapered form of the threads.

The chaser members 4 shown in Figs. 7 to 10, inclusive, may be formed in a thread milling machine such as is disclosed in the Friederich Müller Patent No. 1,429,611 dated September 19th, 1922. The body member 2 containing the chaser members 4 may be mounted on the headstock of the machine disclosed in the Müller patent or a suitable holding member may be provided for supporting such chaser members 4 on such headstock. A milling cutter 26, as shown in Figs. 7 and 8, would be mounted on the slide shown in the machine disclosed in the Müller patent in position to engage the chaser members 4.

The machine disclosed in the Müller patent compensates for the helicoidal front cutting faces of the chaser members and effects relieving movements to relieve the teeth of the chaser members. The chaser members may be provided with radial or non-radial cutting faces, as desired. Preferably, however, the teeth are provided with non-radially arranged cutting faces to obtain sharper cutting edges. In case the teeth of the chaser members are provided with non-radially arranged cutting faces, the angle of the teeth on the milling cutter 26 are changed to compensate for such cutting faces. The teeth formed on the chaser members are annular and without lead, as in the case of the chaser members illustrated in Figs. 1 to 6, inclusive. After the chaser members have been formed in the manner above set forth, the front cutting faces 16 may be ground in a machine such as is disclosed in the reissue patent to Friederich Müller No. 15,206 dated October 11, 1921.

Figs. 9 and 10 diagrammatically illustrate an attachment which may be used on the grinding machine disclosed in the reissue patent in order to grind the chaser members. The chaser member to be ground is inserted in a slot 27 formed in a bracket 28. The slot 27 is formed with the same inclination as the slot 5 formed in the body member 2. The bracket 28 is pivotally mounted and is given a movement of rotation while being moved longitudinally with respect to the grinding wheel 29. The means for effecting the rotative movement of the longitudinal movement of the bracket is disclosed in the reissue patent.

In an internal hob constructed in accordance with my invention, it will be apparent the chaser members are so formed as to cut threads in a more efficient manner than has heretofore been effected. The inclining of the cutting edge with respect to the hob axis serves to effect a shearing cut when operating on a blank. Moreover, providing the teeth with non-radial cutting faces effects a smoother cut on the blank.

Modifications in the hob and in the arrangement and location of parts may be made within the spirit and scope of my invention and such modifications are intended to be covered by the appended claims.

What I claim is:

1. In an internal hob, the combination comprising a body portion having a plurality of slots cut therein, said slots being inclined with respect to the axis of the hob, and chaser members inserted in said slots with the cutting edges inclined to the axis of the hob, the cutting faces of the chaser members being non-radially arranged, and the tops of the chaser members being formed concave to cut taper threads.

2. In an internal hob, the combination comprising a body portion, a plurality of chaser members mounted on said body portion, and means for firmly holding said chaser members in adjusted position, the cutting faces of the chaser members being non-radially arranged, the cutting edges being inclined with respect to the axis of the hob, and the tops of the chaser members being formed concave to cut taper threads.

3. In an internal hob, the combination comprising a body portion, a plurality of chaser members mounted on said body portion, and bolts having inclined portions engaging similar inclined portions on the chaser members to hold the latter firmly in adjusted position, the chaser members engaging shoulders at the end of the inclined portions on the bolts and the bolts engaging shoulders at the ends of the inclined portions on the chaser members, the cutting faces of the chaser members being non-radially arranged, the cutting edges being inclined with respect to the axis of the hob, and the tops of the chaser members being concave to cut taper threads.

4. In an internal hob, the combination comprising a body portion, a plurality of chaser members mounted on the body portion, an inclined surface on each of said chaser members, and a bolt associated with each of said chaser members and having an inclined portion adapted to engage the inclined portion of the associated chaser members for holding the latter securely in position, the cutting faces of the chaser members being non-radially arranged, the cutting edges being inclined with respect to the axis of the hob, and the tops of the chaser members being formed concave in accordance with the inclination of the cutting edges.

5. In an internal hob, the combination comprising a body portion, and a plurality of chaser members mounted on said body portion and having annular teeth formed thereon, the chaser members being mounted in the body portion with the cutting faces non-radially arranged, the cutting edges of the chaser members being inclined with respect to the axis of the hob, and the tops of the chaser members being formed concave to cut pipe threads.

6. In an internal hob for cutting threads, the combination comprising a body portion having longitudinal slots formed therein, and a plurality of chaser members mounted in the slots formed in said body portion and having annular relieved teeth formed thereon, the sides of said slots being non-radially arranged and the front cutting faces of the chaser members being non-radially arranged, the cutting edges being inclined with respect to the hob axis, and the tops of the chaser members being formed concave in accordance with the inclination of the cutting edges.

7. In an internal hob, the combination comprising a body portion, a plurality of chaser members mounted on said body portion and having notches formed in the sides thereof, and means comprising bolts fitted to the notches in the chaser members and having notches formed therein which are fitted to the chaser members, the front cutting edges of the chaser members being inclined with respect to the hob axis, and the tops of the chaser members being formed concave in accordance with the inclination of the cutting edges with respect to the hob axis.

8. In an internal hob, the combination comprising a body portion, a plurality of chaser members mounted on said body portion and having annular teeth formed thereon, and means comprising bolts having inclined surfaces formed thereon for engaging similar surfaces on the chaser members to hold the latter firmly in position, each bolt engaging a shoulder at the end of the inclined surface on the associated chaser member and each chaser member engaging a shoulder at one end of the inclined surface on each associated bolt, the front cutting faces of the chaser members being undercut, the cutting edges of the chaser members being inclined with respect to the hob axis, and the tops of the chaser members being formed concave in accordance with the inclination of the cutting edge with respect to the hob axis and the taper to be formed on the thread.

In testimony whereof, I hereto affix my signature.

ALBERT W. ERDMAN.